United States Patent [19]
Kay

[11] 3,771,031
[45] Nov. 6, 1973

[54] HEADER ASSEMBLY FOR LASERS

[75] Inventor: David B. Kay, Irving, Tex.

[73] Assignee: Texas Instruments Incoporated, Dallas, Tex.

[22] Filed: Mar. 5, 1973

[21] Appl. No.: 337,815

Related U.S. Application Data

[63] Continuation of Ser. No. 880,877, Nov. 28, 1969, abandoned.

[52] U.S. Cl...... 317/235 R, 317/234 A, 317/234 A, 317/234 N, 317/235 N, 313/108 D, 331/94.5
[51] Int. Cl......................... H01l 11/00, H01l 15/00
[58] Field of Search................ 313/108 D; 317/234, 317/1, 4, 4.1, 5.4, 235, 27; 331/94.5

[56] References Cited
UNITED STATES PATENTS

| | | | |
|---|---|---|---|
| 2,669,663 | 2/1954 | Pankore | 317/235 |
| 3,303,432 | 2/1967 | Garfinkel | 313/108 D |
| 3,351,698 | 11/1967 | Marinace | 317/235 |
| 3,438,057 | 4/1969 | Neitzel | 313/108 D |
| 3,471,801 | 10/1969 | Woodbury et al. | 331/94.5 |
| 3,519,888 | 7/1970 | Parrish | 317/234 |
| 3,581,162 | 5/1971 | Wheatley | 317/234 |

*Primary Examiner*—John W. Huckert
*Assistant Examiner*—Andrew J. James
*Attorney*—Alva H. Randy

[57] ABSTRACT

A header assembly includes a header and a connector both formed from an electrically and thermally conductive material. One or more light emitting members are mounted on the header and are connected between the header and the connector. In use, pluralities of aligned header assemblies are mounted adjacent each other to form sets of header assemblies. The sets are in turn positioned around a laser rod with the light emitting members of the header assemblies facing the rod.

9 Claims, 8 Drawing Figures

PATENTED NOV 6 1973 3,771,031

INVENTOR:
DAVID B. KAY

René E. Grossman

ATTORNEY

PATENTED NOV 6 1973 3,771,031

INVENTOR:
DAVID B. KAY

ATTORNEY

HEADER ASSEMBLY FOR LASERS

This is a continuation of application Ser. No. 880,877, filed Nov. 28, 1969 and now abandoned.

At the present time, a number of different lasers are known and in use. These include crystalline lasers, liquid lasers, glass lasers, gas lasers and semiconductor lasers. This invention relates to lasers that are excited by light emitting diodes. Lasers of this type have certain advantages over other lasers in that they include solid state components and are therefore relatively uncomplicated to design, construct and operate.

In particular, the present invention relates to header assemblies for light emitting members. In accordance with the preferred embodiment, a header assembly includes at least one light emitting member and a header that both supplies an electric potential to and removes heat from the light emitting member. The assembly further includes a connector that is electrically connected to the light emitting member.

In the practice of the invention, groups of individual header assemblies are joined into sets. The sets of header assemblies are in turn positioned around a laser rod to form a laser. In this manner, a laser including any desired number of light emitting members is easily fabricated.

A more complete understanding of the invention may be had by referring to the following detailed description when taken in conjunction with the drawings, wherein.

Figure 1:
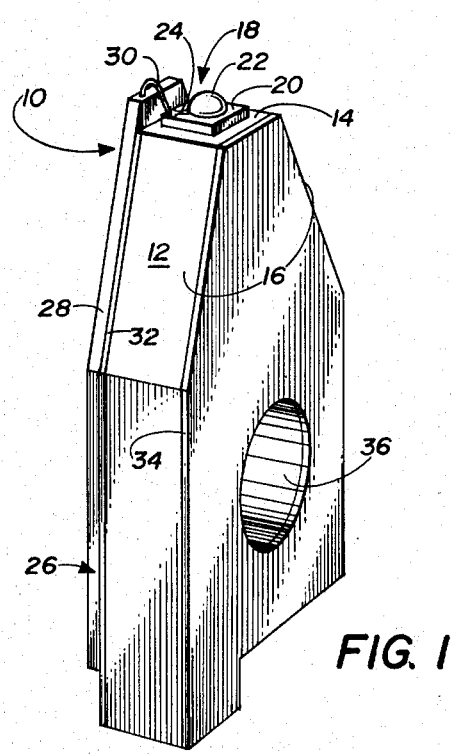
FIG. 1 is a prespective view of a header assembly employing the invention.

Referring now to the drawings, and particularly to FIG. 1, a header assembly 10 employing the invention is shown. The assembly 10 includes a header 12 which comprises a plate shaped body formed from an electrically and thermally conductive material such as copper, silver, molybdenum, etc. The header 12 includes an end surface 14 and a pair of angularly extending header locating surfaces 16. A light emitting member 18 is mounted on the surface 14 of the header 12.

The light emitting member 18 includes a submount 20 positioned in engagement with the surface 14 of the header 12 and a light emitting diode 22 positioned on the upper surface of the submount 20. The submount 20 comprises a body of conductive silicon or the like and has a non-conductive oxide layer formed on a portion of its upper surface. The diode 22 has two terminals, one of which engages the conductive body of the submount 20 and is therefore connected to the header 12 and the other of which is connected to a printed circuit lead 24 formed on the oxide layer of the submount 20.

The assembly 10 further includes a connector 26 which also comprises a plate shaped body of electrically and thermally conductive material. The connector 26 is positioned adjacent the header 12 and includes a pair of locating surfaces 28 which extend at the same angle as the surfaces 16 of the header 12. The connector 26 is connected to the diode 22 of the light emitting member 18 by a lead 30 which extends to the printed circuit lead 24 formed on the submount 20. The top of connector 26 may extend above end surface 14 for protection of the diode 22 as well as to facilitate electrical interconnection thereto. Furthermore the top portion of connector 26 extending above the surface 14 may be reflective to enhance optical coupling.

The header 12 and the connector 26 are separated by a layer of electrically insulating material 32. Another layer of electrically insulating material 34 is formed either on the outside surface of the header 12 as shown, or on the outside surface of the connector 26. A mounting hole 36 extends through the several components of the header assembly 10. The hole 36 includes a reduced diameter portion formed in the header 12 and an enlarged diameter portion formed in the connector 26.

Figure 2:
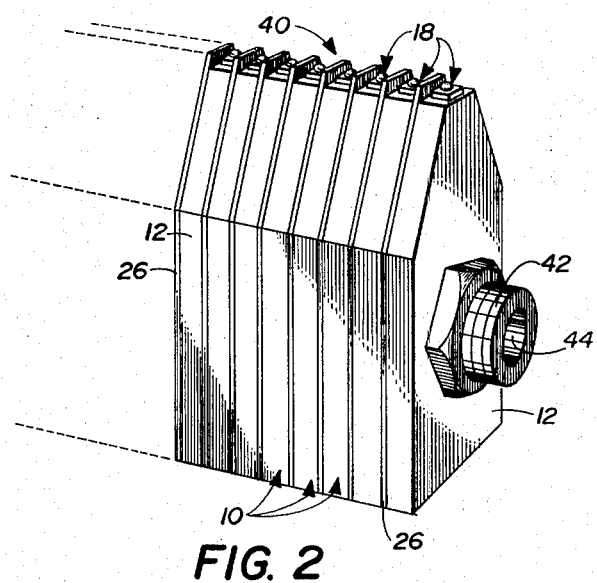
FIG. 2 is a prespective view of a set of header assemblies.

Referring now to FIG. 2, a set of header assemblies 40 including a plurality of identical header assemblies 10 is shown. The assemblies 10 comprising the set 40 are positioned adjacent each other along a line and are insulated from each other by their respective layers of electrically insulating material 34. The assemblies 10 are retained in the set 40 by a bolt 42 which extends through the holes 36 formed through the assemblies. The bolt 42 is comprised of a thermally conductive material and has a coolant passageway 44 formed through it. The outside diameter of the bolt 42 is equal to the inside diameter of the reduced diameter portions of the holes 36 and, accordingly, the bolt 42 engages the headers 12 of the set 40 but does not engage the connectors 26 thereof. Although the transfer of heat requirement has been illustrated by utilizing coolant passageway 44 (and passing a coolant therethrough), it will be recognized that the bottom portion of header 12 may be extended and flared to form a fin for connection, radiation or forced air cooling.

Figure 3:
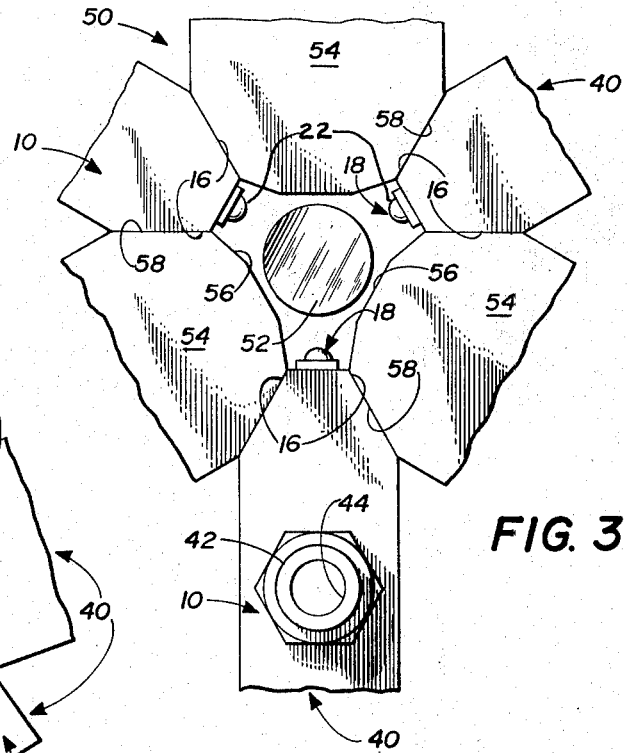
FIG. 3 is an end view of a laser including sets of header assemblies.

A laser 50 employing three sets of header assemblies 40 is shown in FIG. 3. In the laser 50, the sets of header assemblies 40 are positioned in an array around a laser rod 52. The sets 40 are separated by spacer members 54 having reflective surfaces 56, it being understood that as used herein the term "reflective" is not limited to mirror surfaces and includes white and other similarly reflective surfaces. The members 54 also include locating surfaces 58 which cooperate with the surfaces 16 of the headers 12 and the surfaces 28 of the connectors 26 to form an array that encloses the laser rod 52. The members 54 either are formed from an electrically insulating material or are electrically insulated from the assemblies 10.

In the use of the laser 50, the diodes 22 of the header assemblies 10 are energized by connecting the headers 12 and the connectors 26 of the assemblies to suitable sources of electrical potential. This may be accomplished either on an individual assembly basis or by forming either parallel or series connections to each connector 26 and to each header 12 comprising a set 40. Upon energization, the diodes 22 excite or pump the laser 50 by producing light that is converted by the laser rod 52 into a laser beam. During this operation, heat is removed from the diodes 22 by passing a coolant through the passageways 44 formed in the bolts 42 of the sets 40.

By way of example, assume that the laser rod 52 is formed from the material known as neodymium in the yttrium aluminum garnet (Nd:YAG). In such a case, the diodes 22 are preferably similar in construction to the type sold by Texas Instruments, Incorporated as a part of the product identified as TIXL09 but are preferably comprised of gallium arsenide phosphide. Diodes of this type can be made to produce light having a nominal wave length of 8,000 angstroms and having a band width of about 200 angstroms. Such light is converted by the Nd:YAG rod into a laser output.

Figure 4:
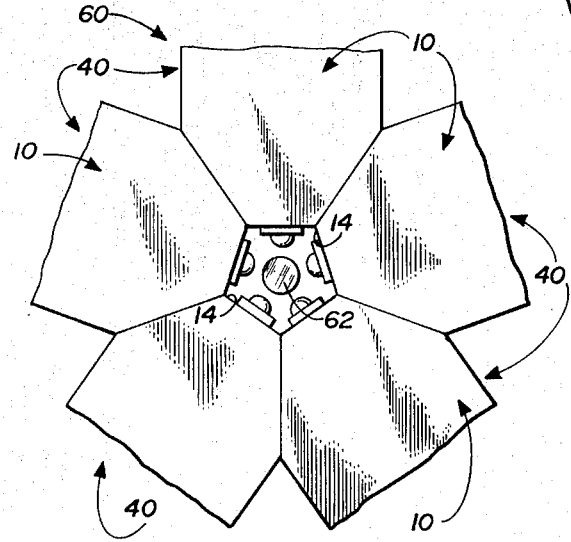
FIG. 4 is an end view of another laser including sets of header assemblies.

A laser 60 employing five sets of header assemblies 40 is shown in FIG. 4. The laser 60 is similar to that laser 50 in that it includes a laser rod 62 that is excited by the diodes 22 of the assemblies 10. The laser 60 differs from the laser 50 in that it is comprised entirely of sets of header assemblies 40 and in that the surfaces 14 of the header assemblies 10 are reflective. In the laser 60, the surfaces 16 and 28 of the assemblies 10 are mounted in engagement with but insulated from each other so that the laser rod 62 of the laser 60 is completely enclosed.

Figure 5:
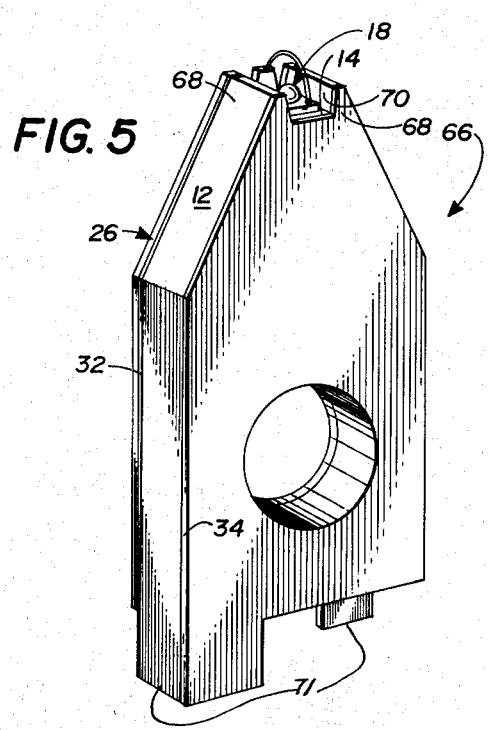
FIG. 5 is a prespective view of another header assembly employing the invention.

Referring now to FIG. 5, a modified header assembly 66 is shown. The modified assembly 66 is similar to the assembly 10 shown in FIG. 1 except that the surface 14 of the modified assembly 66 is positioned between a pair of upstanding projections 68. The projections 68 include interior surfaces 70 which are made reflective in order to concentrate the light emitted from the diodes 22. The projections 68 also protect the light emitting member 18 in case the modified assembly 66 is dropped, etc. Similar to FIG. 1, electrical connection to the header assembly in FIG. 5 is made through tabs 71.

Figure 6:
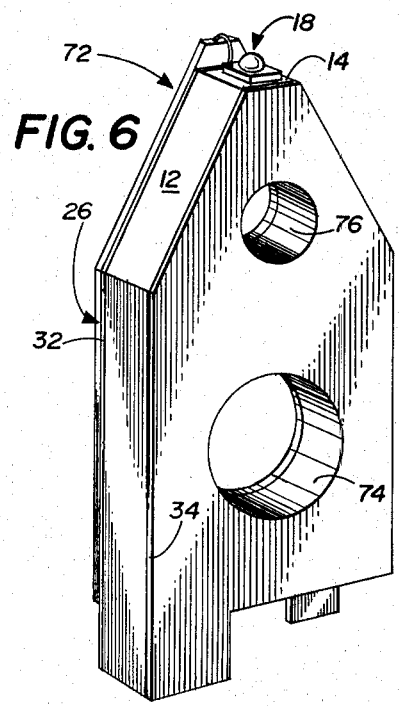
FIG. 6 is a prespective view of still another header assembly employing the invention.

A second modified header assembly 72 is shown in FIG. 6. The assembly 72 differs from the assembly 10 shown in FIG. 1 principally in that it has a pair of holes 74 and 76 formed through it. The hole 74 is a mounting hole and serves the same function as the hole 36 of the assembly 10. The hole 76, on the other hand, comprises a coolant passageway. In the use of the assembly 72, the layers of insulation 32 and 34 serve as gaskets to prevent the leakage of coolant flowing in the passageway 76.

Figure 7:
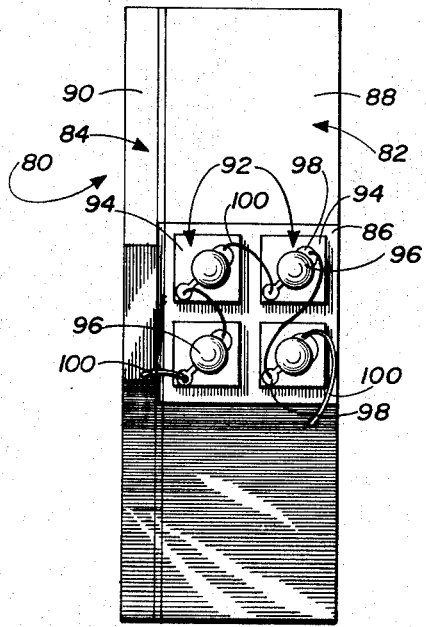
FIG. 7 is an illustration of an alternative embodiment of the invention.

Referring now to FIG. 7, a header assembly 80 comprising a second embodiment of the invention is shown. The assembly 80 is similar to the assembly 10 in that it includes a header 82 and a connector 84, both of which are formed from an electrically and thermally conductive material. The header 82 has an end surface 86 and locating surfaces 88 and the connector 84 has locating surfaces 90.

The assembly 80 differs from the assembly 10 primarily in that the surface 86 of the header 82 supports four light emitting members 92. Each of the members 92 includes a submount 94 formed from an insulating material and a light emitting diode 96. The diode 96 of the members 92 have two terminals which are connected to printed circuit leads 98 formed on the submounts 94.

The four lights emitting members 92 of the header assembly 80 are connected in series with each other and with the header 82 and the connector 84 of the assembly by a plurality of leads 100. One of the leads 100 extends from the header 82 to a printed circuit lead 98 on one of the members 92. Another lead 100 couples the connector 94 to a printed circuit lead 98 on another member 92. The remaining leads 100 extend between printed circuit leads 98 on adjacent members 92 to connect the members in series.

In the use of the second embodiment, a plurality of identical header assemblies 80 are joined into a set similar to the set 40. Then, one or more sets are employed in a laser, such as the laser 50 or the laser 60. The resulting laser is operated identically to the laser 50 except that the individual header assemblies 80 comprising the laser produce more light than the individual assemblies 10 comprising the laser 50.

Figure 8:
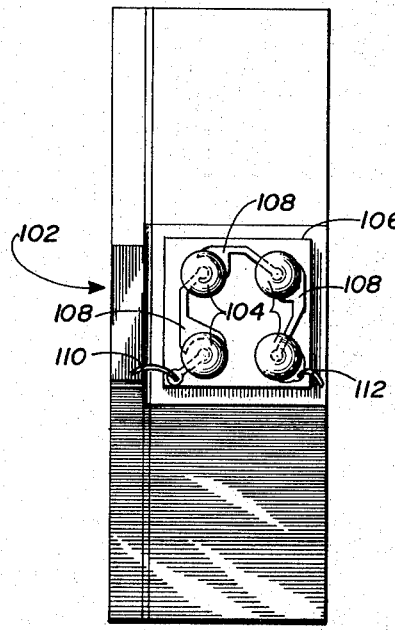
FIG. 8 is an illustration of another alternative embodiment of the invention.

FIG. 8 comprises an illustration of the third embodiment of the invention. The third emboidment comprises a header assembly 102 which is similar to the assembly 80 in that it includes four light emitting diodes 104. However, the diodes 104 of the third embodiment are mounted on a single submount 106 formed from an insulating material. The submount 106 includes a plurality of printed circuit leads 108 would connect the various light emitting diodes 104 of the third embodiment in series. One of the leads 108 is connected to the connector of the assembly 102 by a wire 110. Another of the leads 108 is connected to the header of the assembly 102 by a wire 112. The third embodiment of the invention is operated identically to the second embodiment.

It should be understood that although the embodiments and modifications of the invention shown in the drawings are preferred, the invention is capable of numerous variations. For example, each header assembly can support any convenient number of light emitting members. The light emitting members of each assembly can be connected either in series or in parallel. The light emitting members of the various assemblies comprising a set need not be of the same type and can vary in number. And, the header assemblies can be of any desired shape and can be arranged in any conveneint manner.

The use of the present invention results in several advantages over the prior art. First, extremely high diode packing densities are achieved. Second, header assemblies constructed in accordance with the invention comprise building blocks that can be employed to mount any desired number of light emitting members in a laser, including very large numbers of diodes. Third, the use of the invention results in a minimum number of non-reflective surfaces and in maximum heat transfer from the light emitting members and is, therefore, consistent with the optical and temperature requirements of lasers. Fourth, the invention permits the wiring of light emitting members individually, in series or in parallel, as desired. Fourth, the use of individual header assemblies simplifies laser construction and repair.

Although specific embodiments of the invention are illustrated in the drawings and described herein, it will be understood that the invention is not limited to the embodiments disclosed but is capable of rearrangement modification and substitution of parts and elements without departing from the spirit of the invention.

What is claimed is:

1. A header assembly for optically pumping laser rods comprising in combination:
   a. a header formed from a thermally and electrically conductive material, said header having at least two angularly extending header locating surfaces and at least two substantially parallel sides;
   b. a connector formed from an electrically conductive material, said connector having at least two substantially parallel sides;
   c. means for positioning said connector in substantially parallel relationship to and electrically insulated from said header;
   d. at least one light emitting member mounted on said header; and
   e. connecting means for connecting said light emitting member to said header and to said connector.

2. A header assembly in accordance with claim 1 wherein said light emitting member includes a light emitting diode.

3. A header assembly in accordance with claim 1 wherein said light emitting member includes a plurality of light emitting diodes.

4. A header assembly in accordance with claim 1 wherein said light emitting member includes a plurality of light emitting diodes with each of said diodes positioned on an individual submount, each submount being secured to said header.

5. A header assembly for a laser using a laser rod comprising:
   a. a header including a thermally and electrically conductive body having a tetrahedrally shaped end surface, first opposing sides having portions depending outwardly from said end surface to form header locating surfaces, and second opposing substantially parallel sides depending from said end surface;
   b. layers of insulating material attached to the depending substantially parallel sides of the thermally and electrically conductive body for electrically insulating said pair of parallel sides;
   c. an electrical connector attached to the insulating layer of one of said parallel sides, said electrical connector having an end terminating adjacent to the end surface of said thermally and electrically conductive body;
   d. at least one light emitting means operatively attached to the end surface of said body; and
   e. coupling means electrically coupling the at least one light emitting member to the electrical connector; whereby a plurality of said header assemblies may be positioned with their parallel sides successively adjacent to one another to form a linear set of header assemblies and a plurality of sets positioned with locating surfaces abutting adjacent locating surfaces for forming a tubular array for the laser rod.

6. A header assembly according to claim 5 wherein said header assembly includes a passage through said substantially parallel surfaces, insulating layers, and connector for a coolant for removing heat from said header.

7. A header assembly according to claim 5 wherein said header includes a fin formed on the lower surface thereof.

8. A header assembly according to claim 5 wherein said light emitting means includes a submount positioned on the thermally and electrically conductive body of said header, said submount having a portion thereof in electrical contact with said thermally and electrically conductive body and an insulating portion bearing an electrical lead insulated from said thermally and electrically conductive body, a light emitting diode positioned on said submount with electrical contacts connected respectively to the portion in electrical contact with the thermally and electrically conductive body and electrical lead of said submount; and means electrically coupling said submount lead to said connector.

9. A header assembly according to claim 5 wherein the outwardly depending portion of said opposing sides of said thermally and electrically conductive body extend above said tetrahedrally shaped end surface and include reflective interior surfaces for reflecting light upwardly for improving the light output of the header assembly.

* * * * *